United States Patent [19]
Harada et al.

[11] Patent Number: 4,911,631
[45] Date of Patent: Mar. 27, 1990

[54] ROTARY ROLL EXTRUDER

[75] Inventors: Jumei Harada; Michitoshi Sorioka, both of Kodaira, Japan

[73] Assignee: Bridgestone Corporation, Tokyo, Japan

[21] Appl. No.: 321,828

[22] Filed: Mar. 10, 1989

[30] Foreign Application Priority Data

Mar. 30, 1988 [JP] Japan ................................. 63-74458

[51] Int. Cl.$^4$ ............................................. B29C 47/32
[52] U.S. Cl. .................................... 425/183; 425/185; 425/186; 425/190; 425/194; 425/374; 425/381; 425/466
[58] Field of Search ............... 425/183, 185, 186, 190, 425/194, 381, 363, 374, 382.3, 382.4, 447, 466, 376.1, DIG. 235; 264/175, 176.1

[56] References Cited

U.S. PATENT DOCUMENTS

| | | | |
|---|---|---|---|
| 1,350,722 | 8/1920 | Goodenberger | 425/466 |
| 1,715,859 | 6/1929 | Norton | 425/376.1 X |
| 3,085,292 | 4/1963 | Kindseth | 425/466 X |
| 3,093,860 | 6/1963 | Eilersen | 425/466 X |
| 3,112,527 | 12/1963 | Pankratz et al. | 425/466 |
| 3,142,091 | 7/1964 | Curtiss | 425/375 X |
| 3,145,419 | 8/1964 | Reifenhauser | 425/466 |
| 3,195,183 | 7/1965 | Phillips | 425/466 |
| 3,871,810 | 3/1975 | Geyer | 425/374 |
| 4,174,200 | 11/1979 | Hoj | 425/377 X |
| 4,299,789 | 11/1981 | Giesbrecht | 425/447 X |
| 4,416,605 | 11/1983 | Konno et al. | 425/186 X |
| 4,576,563 | 3/1986 | Harada et al. | 425/194 |
| 4,718,770 | 1/1988 | Christy | 425/194 X |
| 4,744,745 | 5/1988 | Harada et al. | 425/466 |

FOREIGN PATENT DOCUMENTS

| | | |
|---|---|---|
| 0174260 | 3/1986 | European Pat. Off. . |
| 60-97824 | 5/1985 | Japan . |
| 63-13718 | 1/1988 | Japan . |

*Primary Examiner*—Richard L. Chiesa
*Attorney, Agent, or Firm*—Sughrue, Mion, Zinn, Macpeak & Seas

[57] ABSTRACT

A rotary roll extruder which performs shaping of material to be extruded such as raw rubber, or the like by ejecting the material to be extruded through a mouth piece by means of an extruding roll. This extruder comprises mouth piece moving means for moving a mouth piece in a radial direction of an extruding roll to make the mouth piece approach, or separate from, the circumferential surface of the extruding roll, mouth piece positioning means for positioning the mouth piece when the mouth piece is held apart from the extruding roll, and mouth piece stocking means for preliminarily stocking various kinds of mouth pieces. Shaping of the material to be extruded is effected when the mouth piece has been brought close to the circumferential surface of the extruding roll by the mouth piece moving means and it has been positioned by the mouth piece positioning means. However, for the exchange of the mouth piece, the mouth piece is separated from the extruding roll by the mouth piece moving means, and is exchanged with one of the mouth pieces stocked in the mouth piece stocking means. Thereafter, the new mouth piece is brought close to the circumferential surface of the extruding roll by the mouth piece moving means, and is positioned by the mouth piece positioning means. The mouth piece exchange work is executed automatically without the aid of any human labor.

6 Claims, 9 Drawing Sheets

ROTARY ROLL EXTRUDER

The present invention relates to a rotary roll extruder which performs shaping of a material to be extruded such as raw rubber or the like by ejecting the material to be extruded through a mouth piece by means of an extruding roll.

BACKGROUND OF THE INVENTION

With regard to a rotary roll extruder, heretofore, various kinds of extruders have been proposed, and one example of them (Laid-Open Japanese Utility Model Specification No. 63-13718 (1988)) is illustrated in FIG. 9 and will be explained below.

In FIG. 9, reference numeral 01 designates an extruding roll, and a die head 02 having a flow passageway formed therein towards the circumferential surface of the roll is provided in association with the extruding roll 01. A mouth piece 03 is fixed to the downstream side end edge of the die head 02 as pressed by a mouth piece press member 04.

Material to be extuded 05 fed under a pressure along the flow passageway of the die head 02 comes into contact with the circumferential surface of the extruding roll 01, and it is fed out upwards by rotation of the extruding roll 01.

At this time, the material to be extruded 05 is shaped as a result of passing through the mouth piece 03 having a predetermined shape.

Other examples of the known extruders in the prior art also have a similar structure.

As described above, the rotary roll extruder in the prior art has such a structure that when the mouth piece is to be exchanged, the mouth piece press member is released, and the mouth piece is dismounted in the nearly tangential direction with respect to the roll circumferential surface (in the upper direction as viewed in FIG. 9). Therefore, quick exchange of the mouth piece is difficult.

In addition, the structure is not suitable for performing automatic exchange of the mouth piece, it is difficult to perform an automatic exchange. A known example provided with such an automatic exchange capability has not been proposed.

Furthermore, when the mouth piece has been dismounted, there is nothing to restrain extrusion of the material to be extruded. Hence if an extrusion operation is continued under such a condition, a large amount of material to be extruded would be extruded wastefully, and if more time is consumed for the mouth piece exchange work, then a wasteful amount of the material to be extruded would be increased by the corresponding amount.

Accordingly, it is a common practice to interrupt the extrusion operation upon exchange of the mouth piece, and by the interruption of the extrusion operation normally the material to be extruded would be cut.

In other words, unless the mouth piece exchange is performed after the material to be extruded has been cut, it is difficult to mount a new mouth piece, and if a new mouth piece is mounted while the material to be extruded is kept continued, it must be mounted in such manner that the material to be extruded which has swelled out in the direction of flow may be compressed in the tangential direction with respect to the circumferential surface of the roll. Hence the mounting is difficult, and also in many cases the material to be extruded would be cut after all by the rotation of the extruding roll 01 during the exchange work.

For the above-mentioned reasons, in the prior art upon exchange of the mouth piece the material to be extruded has been cut already. Accordingly, when the extrusion work is subsequently newly performed the tip end of the material to be extruded must be guided, and this necessitates operators' labor.

In addition, once the material to be extruded has been cut, contraction of the end portion of that material to be extruded becomes large. Hence the shape of the extruded material cannot be maintained at a predetermined configuration, and therefore, a certain amount of time is necessary before an extruded material having good quality and precision can be formed stably.

Thus, the known extruder has the shortcomings that a working efficiency of an extruder is lowered in that the material to be extruded is cut upon exchange of the mouth piece, and that essentially an operator is required to intervene.

SUMMARY OF THE INVENTION

The present invention has been designed in view of the above-mentioned shortcomings in the prior art, and one object of the present invention is to provide a rotary roll extruder, in which exchange of a mouth piece can be performed automatically in a short period of time, and the cutting of the material to be extruded is no longer necessary.

According to one feature of the present invention, there is provided a novel rotary roll extruder comprising mouth piece moving means for moving a mouth piece in a radial direction of an extruding roll to make the mouth piece move toward or away from the circumferential surface of the extruding roll, mouth piece positioning means for positioning the mouth piece when the mouth piece is held close to the circumferential surface of the extruding roll, mouth piece exchanging means for performing exchange of the mouth piece when the mouth piece is held apart from the extruding roll, and mouth piece stocking means for preliminarily stocking various kinds of mouth pieces.

According to the present invention, shaping of the material to be extruded is performed when the mouth piece has been brought close to the circumferential surface of the extruding roll by the mouth piece moving means and positioning has been done by the mouth piece positioning means, upon exchange of the mouth piece the mouth piece is separated from the extruding roll by the mouth piece moving means, and is exchanged with another mouth piece stocked in the mouth piece stocking means by the mouth piece exchanging means. Thereafter the new mouth piece is made to approach the circumferential surface of the extruding roll by the mouth piece moving means, and is positioned by the mouth piece positioning means.

The entire mouth piece exchange work can be executed automatically without relying upon any human labor.

Since the mouth piece is moved in the radial direction of the extruding roll by the mouth piece moving means to move toward and away from the circumferential surface of the extruding roll, it is possible to simplify the mechanism and to realize shortening of the working time, and also, even upon exchange of the mouth piece, the extruding work can be continued and it is unnecessary to cut the material to be extruded.

Accordingly, a working efficiency of the rotary roll type extruder can be enhanced, and also manual labor such as guiding of the material to be extruded by operators, can be eliminated.

The above-mentioned and other objects, features, and advantages of the present invention will become more apparent by reference to the following description of preferred embodiments of the invention taken in conjunction with the accompanying drawings.

DESCRIPTION OF THE PREFERRED EMBODIMENTS

In the following, description will be made of one preferred embodiment of the present invention illustrated in FIGS. 1–7.

Figure 1:
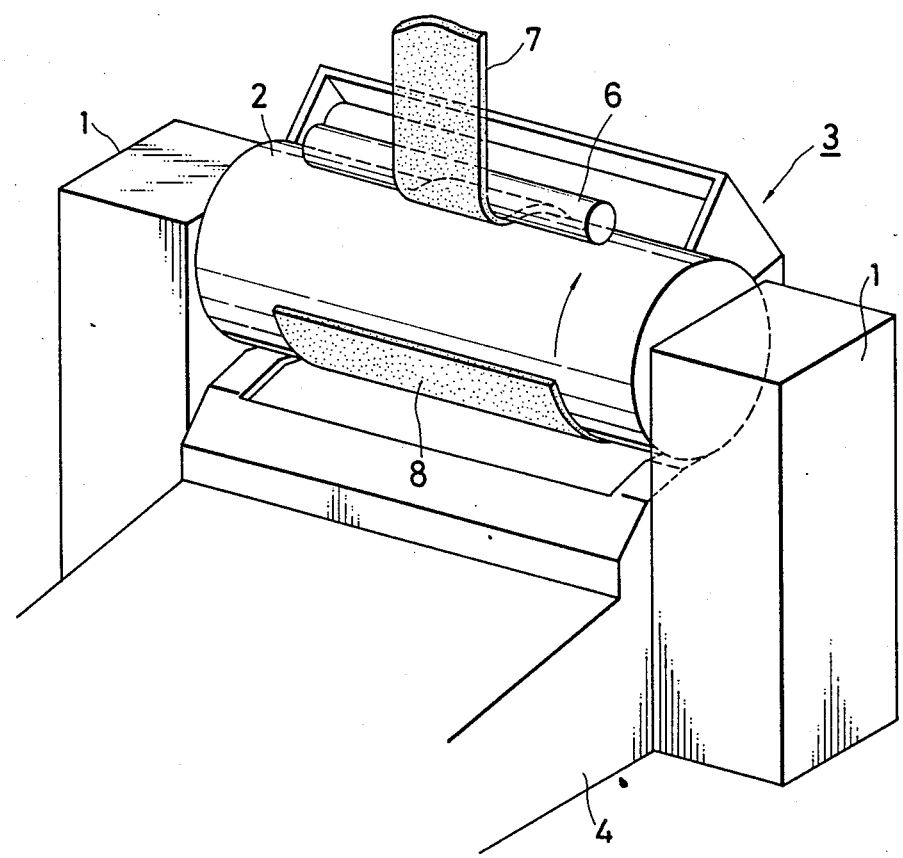
FIG. 1 is a general perspective view of a rotary roll extruder according to one preferred embodiment of the present invention.

FIG. 1 is a general perspective view of a rotary roll extruder according to one preferred embodiment of the present invention, in which an extruding roll 2 is supported rotatably by left and right support members 1, and a chamber block 3 is disposed behind the extruding roll 2.

Under the extruding roll 2 is disposed a mouth piece exchanger 4, and although not shown in FIG. 1, a mouth piece 5 is disposed close to the bottom circumferential surface of the extruding roll. Belt-shaped raw rubber 7 is drawn out along the circumferential surface of the extruding roll 2 via a guide roll 6 disposed above, as a result of rotation in the direction of an arrow of the extruding roll 2, and it is fed to an opening of the chamber block 3.

The raw rubber 7 fed into the chamber block 3 accumulates appropriately in the chamber block 3, simultaneously it is extruded through the mouth piece 5 by rotation of the extruding roll 2, and thereby a shaped raw rubber sheet 8 is formed.

Now the structure of the mouth piece exchanger 4 positioned under the extruding roll 2 will be described.

Figure 2:
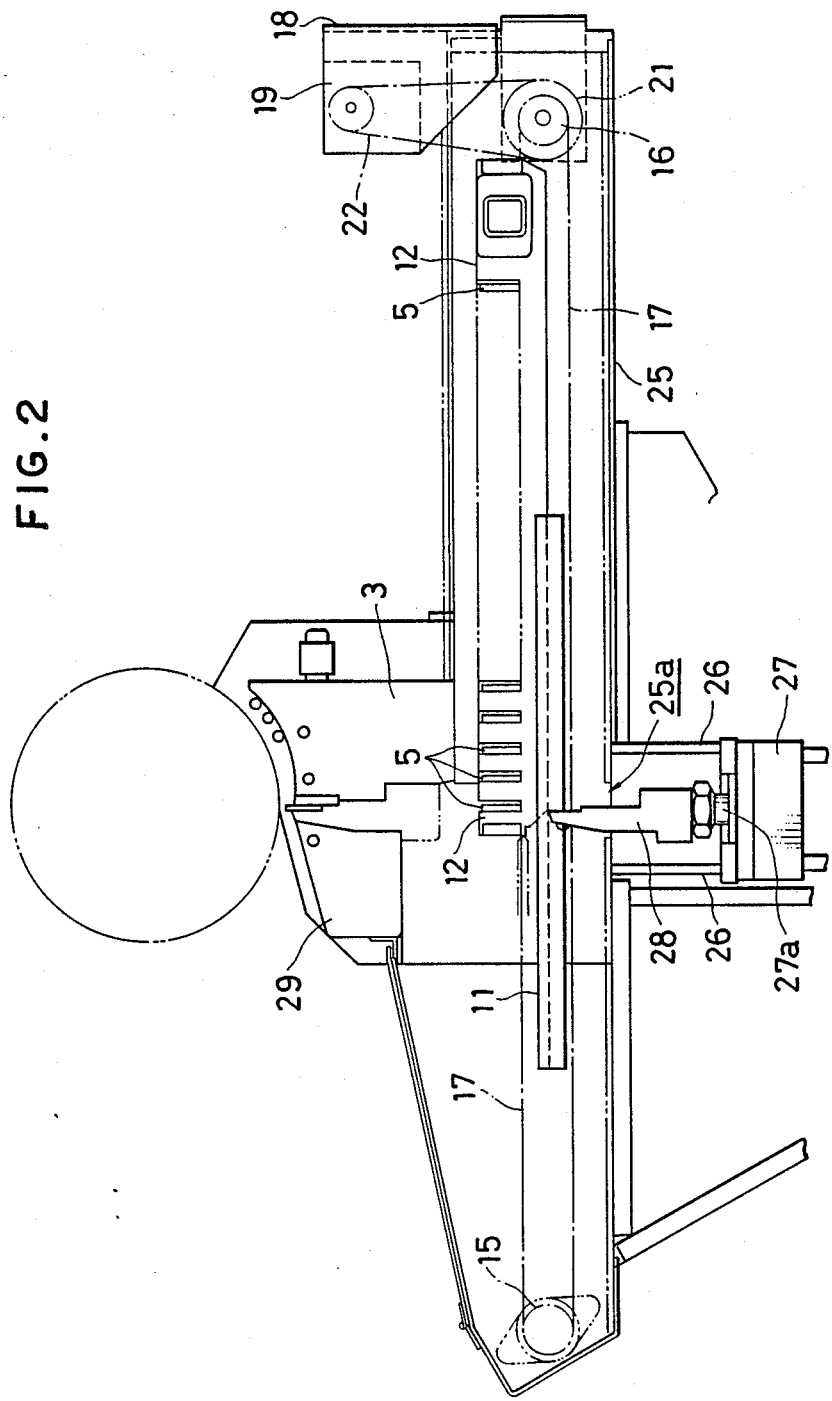
FIG. 2 is a cross-sectional side view of a mouth piece exchanger in the rotary roll extruder shown in FIG. 1.
Figure 3:
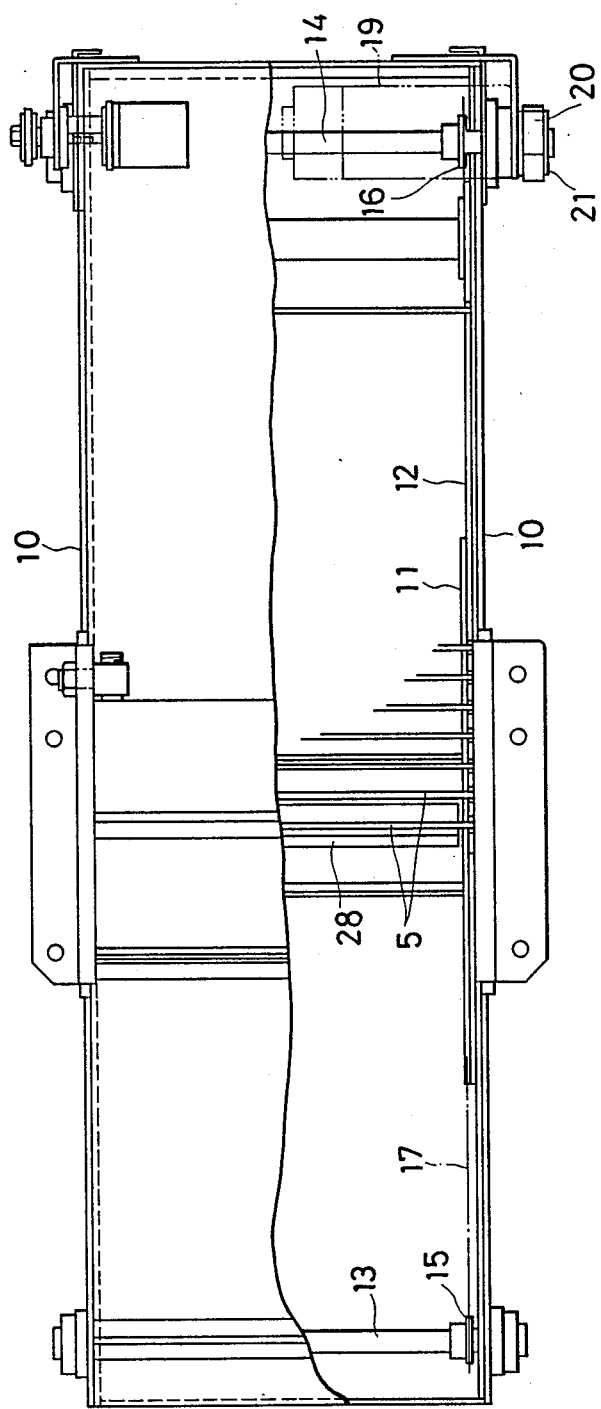
FIG. 3 is a plan view partly cut away of the same mouth piece exchanger.
Figure 4:
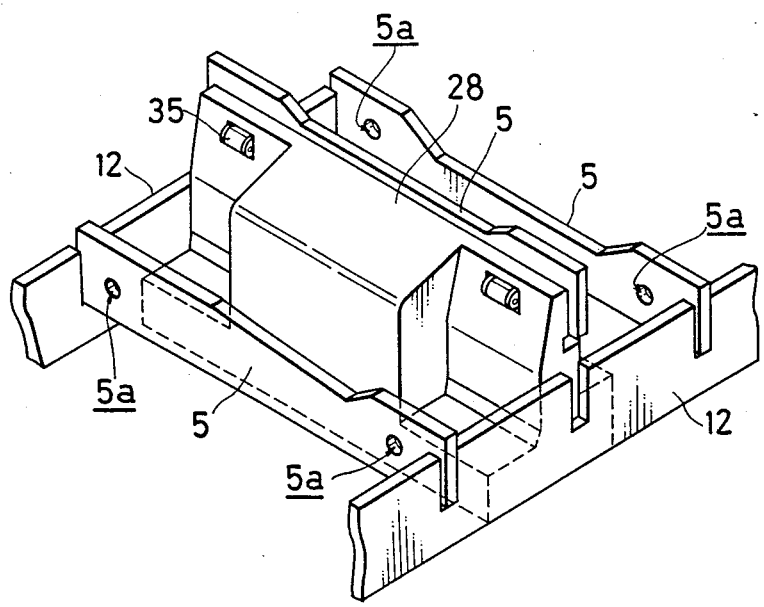
FIG. 4 is a perspective view of a part of a mouth piece stocker and mouth pieces.

FIG. 2 is a cross-sectional side view of the mouth piece exchanger 4, and FIG. 3 is a plan view of the same.

Onto the inside surfaces of left and right side plates 10 of the mouth piece exchanger 4 are fixedly secured guide plates 11 which are elongated in the backward and forward directions (in the left and right directions as viewed in FIGS. 2 and 3) and have the parts of their upper edge portions faced to the corresponding side plates cut away. Planar elongated mouth piece stockers 12 are provided in pairs on the left and right sides as fitted in the cut-away spaces, and these mouth piece stockers 12 are slidable in the backward and forward directions as guided by the guide plates 11 and the side plates 10.

The mouth piece stockers 12 have a plurality of slots extending downwards from their upper edges spaced at predetermined intervals, and various kinds of mouth pieces 5 are stocked with their opposite end portions supported between the corresponding slots of the left and right mouth piece stockers 12.

At the front end portion and the rear end portion of the mouth piece exchanger 4 are pivotably supported shafts 13 and 14 which are directed horizontally in the left and right directions, and at the positions on the left and right hands close to the respective side plates 10 of the shafts 13 and 14 are secured sprockets 15 and 16, respectively, by fitting.

Chains 17 are extended between the corresponding front and rear sprockets 15 and 16 fixedly fitted to the shafts 13 and 14, respectively, and the chain 17 is wound around each sprocket 15 and 16 by a half circumference from its bottom to its top, and the opposite ends of the chain 17 are secured fixedly to the above-described mouth piece stocker 12.

Above the rear shaft 14 is provided a motor 19 supported by a supporting member 18. A sprocket 20 is secured by fitting to a drive shaft of the motor 19 projecting sideways, and a chain 22 is extended between this sprocket 20 and another sprocket 21 which is secured by fitting to an end portion of the above-described shaft 14 projecting from the side plate 10.

Accordingly, when the motor 19 is driven, the shaft 14 is rotated via the chain 22, and the rotation of the shaft 14 can make the mouth piece stockers 12 slide back and forth along the guide plates 11 by the intermediary of the chains 17.

The left and right mouth piece stockers 12 are held always at symmetrical positions, and they can move simultaneously in the same direction under the condition of holding the mouth pieces 5.

In a bottom plate 25 of the mouth piece exchanger 4 is a rectangular hole 25a that is elongated in the left and right directions. Under the extruding roll 2, an air cylinder 27 is supported fixedly from a support frame 26 extended downwardly from this rectangular hole 25a, and a mouth piece holder 28 is secured fixedly to the top end of a cylinder rod 27a that can project upwards from this air cylinder 27.

The mouth piece holder 28 is elongated in the left and right directions, and has a vertically erected attitude. Its length in the left and right directions is somewhat shorter than the distance between the above-described left and right guide plates 11, and so, the mouth piece holder 28 can pass vertically through the space between the guide plates 11 as driven by the air cylinder 27 (see FIG. 4.).

Additionally behind the position at which the mouth piece holder 28 has reached its upper limit, is disposed the above-described chamber block 3, and in front of the mouth piece holder 28 are positioned a pair of left and right taper blocks 29. The mouth piece holder 28 is adapted to be fitted between the chamber block 3 and the taper blocks 29 rising from below.

The structure of the chamber block 3, the taper blocks 29, and the like will be explained in greater detail with reference to FIGS. 5-7.

Figure 5:
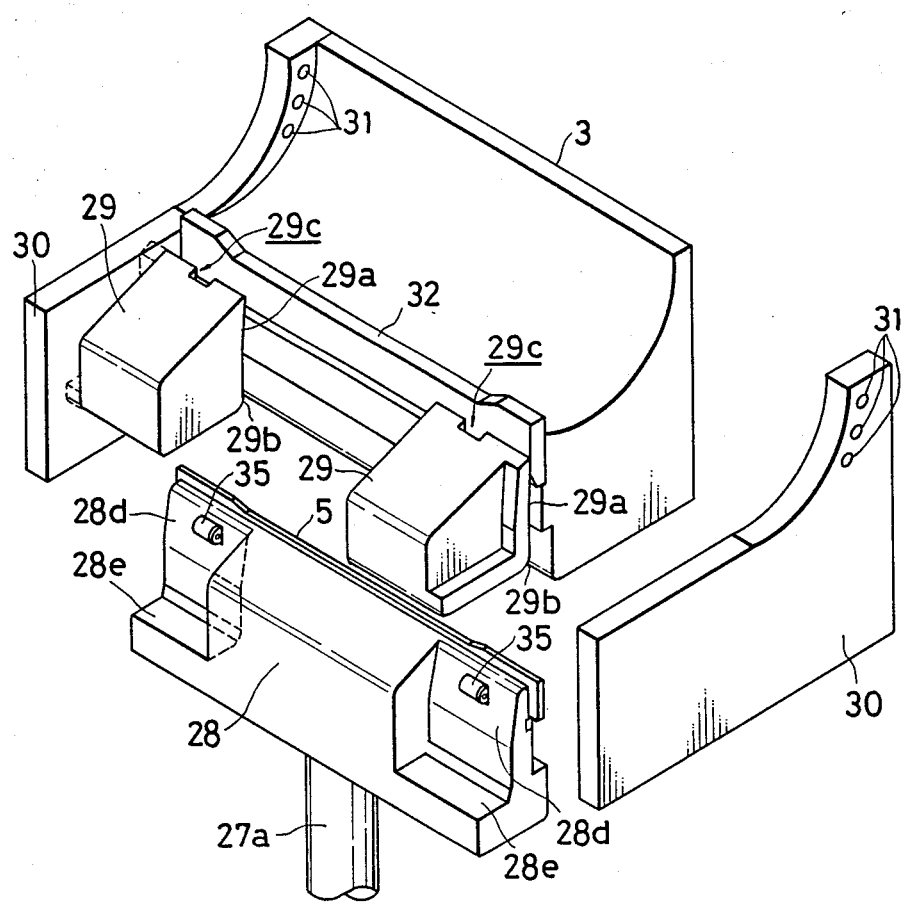
FIG. 5 is a disassembled perspective view of an essential part of a mouth piece exchanger.

As shown in FIG. 5, the chamber block 3 has such a configuration that a portion of a rectangular parallelepiped including its upper front edge has been scooped out in a circular arc shape in cross-section, and its portion including its lower front edge has been scooped out also in a rectangular shape in cross-section, and a pair of side plates are adapted to be secured to the left and right side surfaces of the chamber block 3.

The pair of side plates 30 have arcuated scoops shaped somewhat similarly to the circular arc shape of the scooped portion of the chamber block 3, and the arcuated edge of the side plate 30 projects upwardly from the arcuated surface of the scooped portion of the chamber block 3 under the condition where the side plate 30 has been attached to the chamber block 3. Three circular holes are drilled respectively in the projected and opposed portions of the side plates 30 along the circular arc-shaped edges, and transparent windows 31 made of transparent glass are fitted in the respective circular holes.

These transparent windows 31 are used for detecting a banked amount of the fed raw rubber 7.

Onto the front side surface of the chamber block 3 is attached a back plate 32. The upper edge of the back plate 32 is cut away in the shape of the general mouth pieces, and projects upwardly from the circular arc-shaped scooped portion of the chamber block 3. A chamber for temporarily accumulating raw rubber 7 is formed by the chamber block 3 serving as a bottom wall and a rear wall, and the side plates 30 serving as side walls and the rear plate 32 serving as a front wall, in combination, and the extruding roll 2 is fitted from the above into such a chamber while maintaining a predetermined interval from the arcuated surface of the chamber block 3.

The left and right side plates 30 are extended forwards from the chamber block 3, and the above-described taper blocks 29 are secured fixedly to the inner surfaces of the extended side plate portions.

The taper block 29 forms a nearly cubic body, the lower half portion of the rear side surface of the taper block 29 opposed to the back plate 32 from a vertical plane, but the upper half portion of the rear side surface forms an inclined surface 29a inclined in the obliquely backward direction, and a notch 29c of rectangular shape in cross-section directed in the vertical direction is formed in the same upper half portion as directed in the vertical direction.

Figure 7:
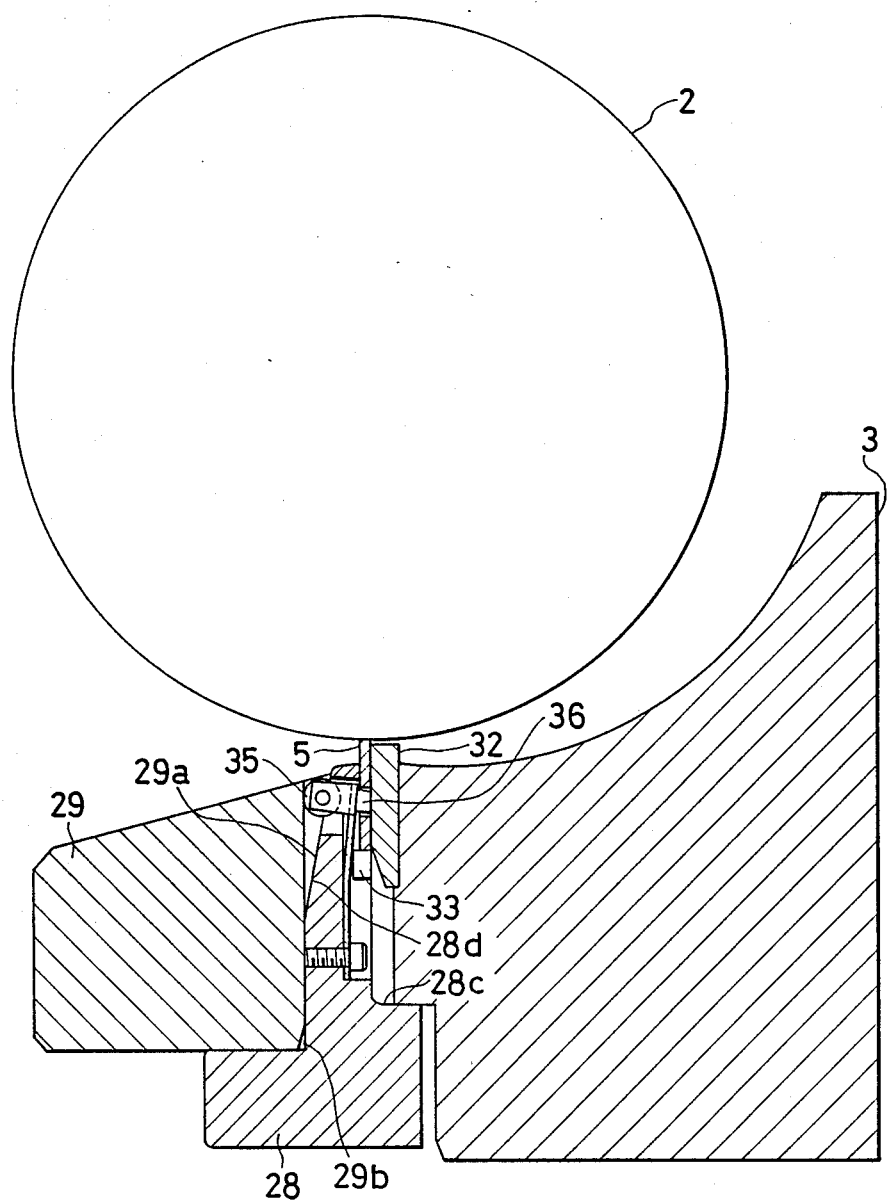
FIG. 7 is a cross-sectional side view of an essential part of the extruder showing the state where a mouth piece has been mounted at a predetermined position.

In addition, at the bottom edge of the rear side surface of the same taper block 29 also is formed a small inclined surface 29b (See FIG. 7.).

On the outer side surface of the taper block 29 coming into contact with the side plate 30 is formed a protrusion extending along the rear side surface and the bottom surface, this protrusion fits in a scoop of the same shape provided at a predetermined position on the side plate 30, and thereby the taper block 29 is secured fixedly the side plate 30.

Figure 6:
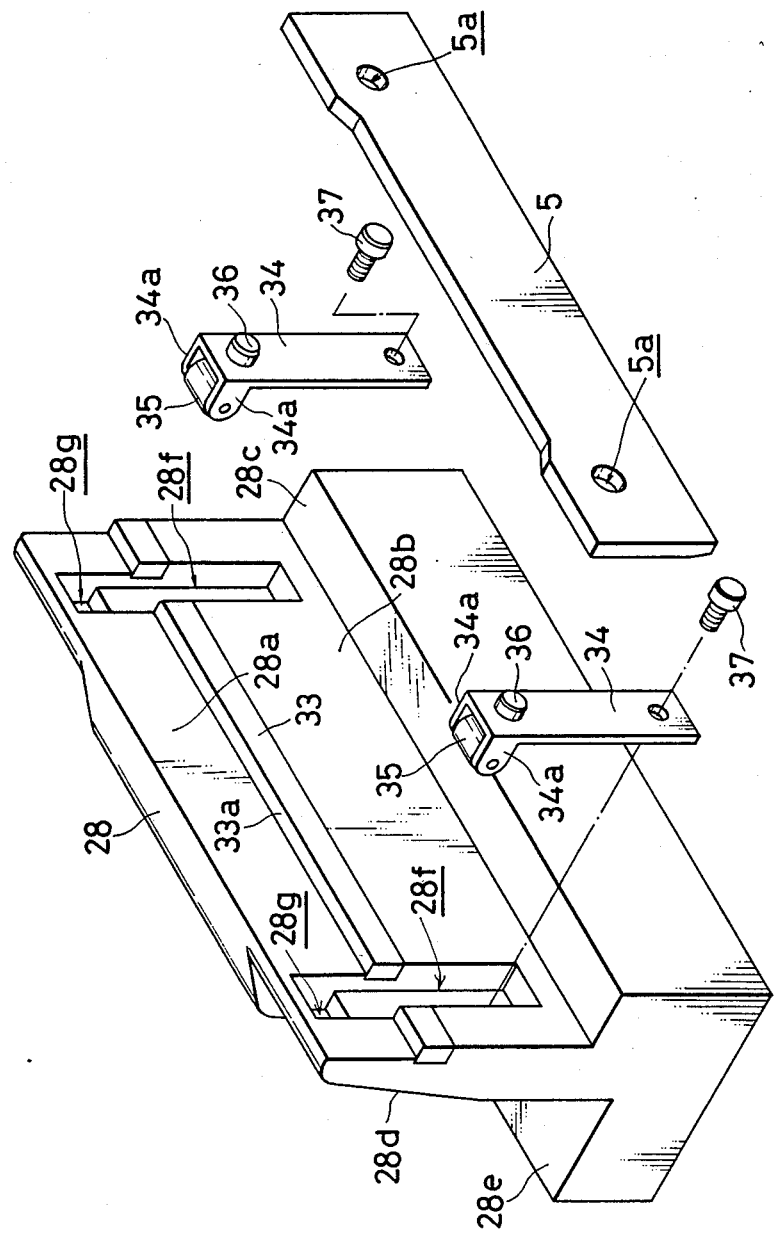
FIG. 6 is a disassembled perspective view of a mouth piece holder.

The above-described mouth piece holder 28 has a configuration adapted to be fitted from below into the space formed between the aforementioned back plate 32 and the taper blocks 29, and as shown in FIG. 6, its rear side surface is cut away in a step form, a horizontal plane 33a at the middle level is formed so as to project backwards by a distance corresponding to the thickness of the mouth piece 5 from the upper vertical plane 28a by fixedly fitting a rectangular pillar shaped magnet rod 33, and a horizontal plane 28c at a lower level than the projected vertical plane 28b projects further backwards.

On the other hand, the front side surface of the mouth piece holder 28 has its left and right portions cut away so as to nearly conform to the shape of the above-described taper blocks 29, but its central portion is formed in a forwardly projected shape.

Accordingly, on the front side surface of the cut-away portion is formed an inclined surface 28d conformed to the inclined surface 29a formed on the rear side surface of the taper block 29, at the upper half portion of the front side surface, but its lower half portion forms a vertical plane, and the bottom surface 28e of the cut-away portion forms a nearly horizontal plane.

In addition, on the rear vertical planes 28a and 28b of the mouth piece holder 28 are formed long vertical grooves 28f on the left and right hands, and between these long grooves 28f and the cut-away portions on the front side are bored rectangular holes 28g.

Into these long grooves 28f are fitted elongated leaf springs 34. On leaf spring 34 are formed bearing portions 34a by bending left and right side projections of its top end portion at right angles towards the front, and a roller 35 is supported rotatably via a pivot between the bearing portions 34a.

Also, a protrusion 36 is provided on the rear side surface of the leaf spring 34 at the position behind the roller 35.

When leaf spring 34 is fitted in the long groove 28f in the mouth piece holder 28 and the bottom end portion of the leaf spring 34 is secured threadedly to the mouth piece holder 28 by means of a screw 37, the roller 35 provided on the front side of the top end portion of the leaf spring 34 passes through the rectangular hole 28g. Most of the roller 35 is projected forwards from the front side inclined surface 28d of the cut-away portion of the mouth piece holder 28, and a rear protrusion 36 sinks in the long groove 28f.

The mouth piece 5 is supported in such manner that it is held in contact with the rear side plane 28a of the mouth piece holder 28 having the above-mentioned structure and placed on the horizontal plane 33a of the magnet rod 33.

The mouth piece 5 has its bottom surface attracted by the magnet rod 33, and under the condition where the mouth piece 5 is held in contact with the vertical plane 28a, the rear side plane of the mouth piece 5 becomes nearly flush with the vertical plane 28b.

In the mouth piece 5 are drilled circular holes 5a at the portion opposed to the protrusion 36 provided on the leaf spring 34 under the above-mentioned condition.

The mouth piece 5 has its upper edge portion cut away in a predetermined shape, and when it is supported by the mouth piece holder 28, the upper edge portion projects upwards from the mouth piece holder 28, and as described previously, its opposite side edge portions also project to the left and to the right, respectively, from the mouth piece holder 28.

The mouth piece exchanger 4 according to this preferred embodiment of the invention is constructed in the above-described manner, and in the following, operations of the same mouth piece exchanger 4 will be explained.

At first, when the mouth piece holder 28 is placed at its lower position, the tip of the mouth piece holder 28 is positioned lower than the mouth pieces 5 stocked in the mouth piece stockers 12 as shown in FIG. 2, and under such a condition, the motor 19 is driven, hence the mouth piece stockers 12 would slide back or forth so that a desired mouth piece 5 may come to the position above the mouth piece holder 28.

Then, if the mouth piece holder 28 is raised by driving the air cylinder 27, the desired mouth piece 5 is supported by being attracted to the horizontal plane of the magnet rod 33 fitted in the mouth piece holder 28, and the mouth piece holder 28 supporting the mouth piece 5 would pass through the space between the mouth piece stockers 12 (See FIG. 4.), and would rise further.

Thus, the mouth piece holder 28 is being fitted into the space between the taper block 29 and the back plate 32 above the taper block 29.

During this process, at first the rollers 35 projected forwards from the front side inclined surface 28d would strike against the inclined surfaces 29b at the bottom end of the rear side surfaces of the taper blocks 29, the rollers 35 are retracted backwards while rolling along the inclined surfaces 29b and 29a of the taper blocks 29, and hence the leaf springs 34 are bent backwards, the protrusions 36 provided on the rear side surfaces of the leaf springs 34 would move backwards to be fitted into the circular holes 5a in the mouth piece 5, and the mouth piece 5 thereby is prevented from being withdrawn upwardly.

Under the above-mentioned condition, if the mouth piece holder 28 rises further, the rear side surface of the mouth piece 5 is joined with the front side surface of the back plate 32, and if it rises still further, the front side inclined plane 28d of the mouth piece holder 28 comes into contact with the rear side inclined planes 29a of the taper blocks 29, and thereafter a wedge action is generated between the respective members, so that the top and portion of the mouth piece holder 28 would press strongly the mouth piece 5 backed by the back plate 32, and would fix the mouth piece 5.

The rise of the mouth piece holder 28 is stopped at the moment when the rear horizontal plane 28c of the mouth piece holder 28 has struck against the upper wall of the lower scoop of the chamber block 3, and thus positioning of the mouth piece 5 is effected.

The state where the mouth piece holder 28 has been fitted perfectly in the space between the taper blocks 29 and the rear plate 32, is shown in FIG. 7, where the left and right upper edge portions of the mouth piece 5 are held at the positions of being held in contact with the circumferential surface of the extruding roll 2, and the mouth piece 5 can be fixed firmly.

Under this condition, extrusion based on the desired mouth piece 5 is executed, and a raw rubber sheet 8 shaped into a predetermined form is being produced.

When the mouth piece 5 is to be exchanged, at first the air cylinder 27 is driven to lower the mouth piece holder 28.

Since the mouth piece 5 is prevented by the protrusion 36 from being withdrawn, it is lowered jointly with the mouth piece holder 28 and is released from the fastening between the back plate 32 and the top end portion of the mouth piece holder 28. When the rollers 35 pass through the inclined planes 29b of the taper blocks 29 and are projected forwards by the restoring forces of the leaf springs 34, the protrusions 36 which have been fitted in the circular holes 5a in the mouth piece 5 would be disengaged from the circular holes 5a, and the mouth piece 5 takes the state of only being attracted by the magnet 33 and supported thereby.

When the mouth piece holder 28 descends further, under the mouth piece holder 28 are positioned the slots of the mouth piece stockers 12 in which this particular mouth piece 5 was stocked previously but which slots are now in a vacant state due to the use of that mouth piece 5. Hence this particular mouth piece 5 is accommodated in the predetermined slots of the mouth piece stockers 12 with the opposite end portions of that mouth piece 5 supported by the same slots, and the mouth piece holder 28 having the mouth piece 5 removed would descend further, and then would stop.

Subsequently, the motor 19 is driven, and the mouth piece stockers 12 thereby are made to slide so that a newly selected mouth piece 5 may come to the position above the mouth piece holder 28. Thereafter the mouth piece holder 28 rises, and is fitted in the space between the taper blocks 29 and the back plate 32 while holding the new mouth piece 5 as described previously. When the new mouth piece 5 has been fixed at the predetermined position, the exchange of the mouth piece is finished.

The time necessitated for this exchange of the mouth piece is a very short time of about 3 seconds, and so, even if the extrusion work of raw rubber is continued during this period, there is no inconvenience because of the short time, and because the extruded amount of raw rubber is restrained to a certain extent by the back plate 32.

As described above, the exchange of the mouth piece is performed perfectly automatically. Even during the exchange of the mouth piece, the extrusion work is continued, and the material to be extruded is not cut, but is continued. Therefore, manual labor such as guiding of a tip end portion produced by cutting can be omitted, and great reduction of workers' labor can be achieved.

In addition, since the material to be extended is always continuous, the time after the exchange of the mouth piece before a predetermined shape of a formed raw rubber sheet can be produced stably, is short. Therefore a wasteful amount of extrusion can be suppressed to a small amount.

In other words, owing to the mouth piece exchange work occurring in a short period of time and the continuous operation of the extruder, a working efficiency of the extruder can be improved.

While the above-described preferred embodiment was designed in such a manner that predetermined mouth pieces are accommodated in predetermined slots of mouth piece stockers 12 and the mouth pieces can be used selectively, now description will be made on a different mouth piece exchanger which employs a method of use such that a sequence of use for mouth pieces is predetermined, and the mouth pieces are exchanged successively according to the predetermined sequence.

Figure 8:
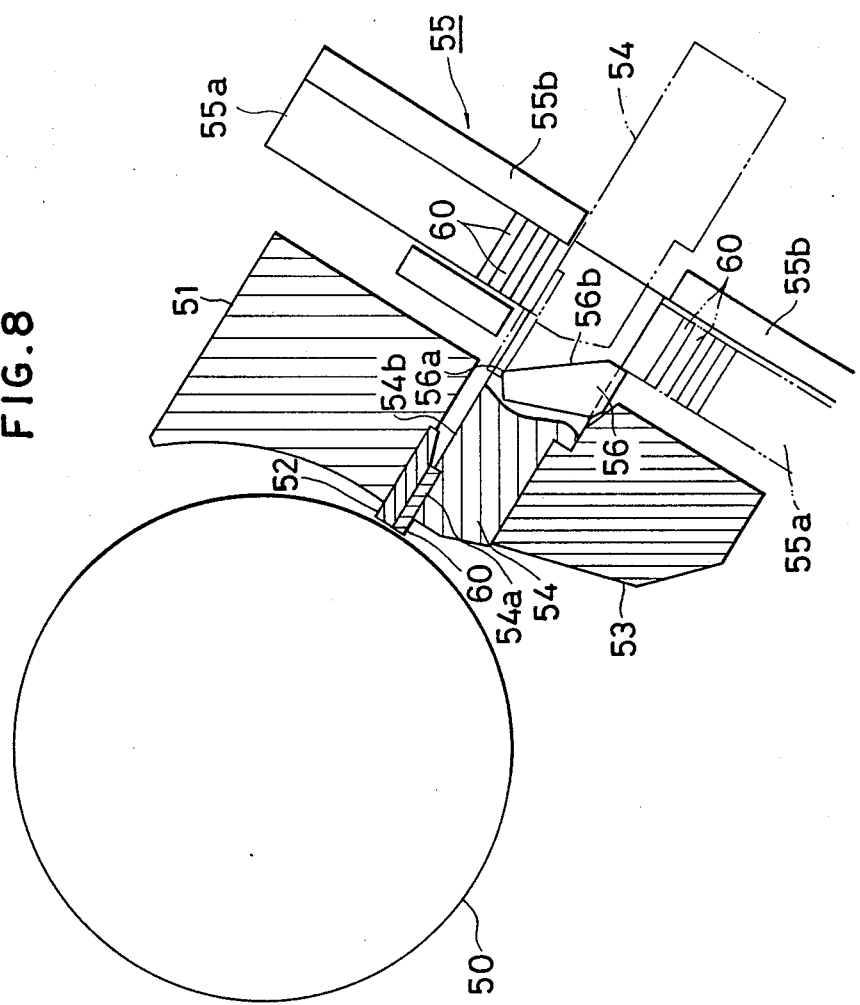
FIG. 8 is a schematic cross-sectional side view of a mouth piece exchanger according to another preferred embodiment of the present invention.
Figure 9:
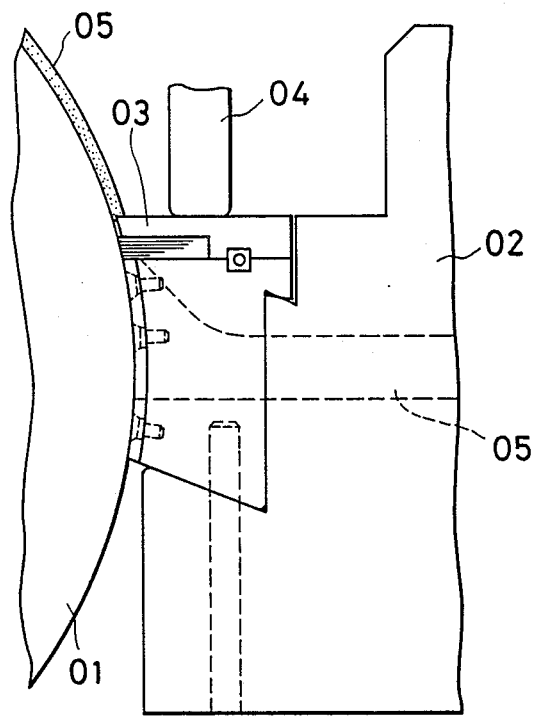
FIG. 9 is a cross-sectional side view of an essential part of a rotary roll extruder in the prior art.

In this modified embodiment, as generally shown in FIG. 8, a roll positioned on the left side is an extruding roll 50, a member positioned on the right side of the extruding roll 50 is a chamber block 51, and obliquely under the chamber block 51 closer to the extruding roll 50 are positioned taper blocks 53.

Onto the front side surface directed obliquely downwards of the chamber block 51 is secured fixedly a back plate 52, and a mouth piece holder 54 adapted to be inserted and fitted in the space between the back plate 52 and the taper blocks 53 is movable in the direction inclined by about 45 degrees.

Obliquely under the chamber block 51 and the taper blocks 53 is provided a mouth piece stocker 55 extending in the direction at right angles to the moving direction of the mouth piece holder 54.

The above-mentioned mouth piece stocker 55 consists of left and right side plates 55a and a bottom plate 55b, and a part of the bottom plate 55b is opened so that the mouth piece holder 54 can pass through the opening.

In addition, at the position between the taper blocks 53 and the mouth piece stocker 55, arm members 56 are secured fixedly to a frame not shown so as to embrace the mouth piece holder 54 from the opposite sides.

The above-mentioned arm members 56 are held close to the mouth piece holder 54. The top end portions 56a of the arm members 56 extend up to the vicinity of the rear side surface of the mouth piece holder 54. The rear side surfaces 56b of the arm members 56 incline steeply from the top end portions 56a and reach the vicinity of the mouth piece stocker 55.

At the top end portion of the mouth piece holder 54 is provided a scoop 54a, so that a mouth piece 60 can be fitted in and supported by the scoop 54a. Since the depth of the scoop is smaller than the thickness of the mouth piece 60, under the fitted condition the mouth piece 60 would project somewhat from the rear side surface of the mouth piece holder 54, and the opposite end portions of the mouth piece 60 also project a little to the left and to the right from the mouth piece holder 54.

Now it is assumed that normal extrusion work is being performed under the condition where, as shown by solid lines in FIG. 8, a mouth piece 60 supported by a mouth piece holder 54 that is fitted in the space between the chamber block 51 and the taper blocks 53 is pinched fixedly between the back plate 52 and the tip end portion of the mouth piece holder 54.

Under the above-mentioned condition, a rear side surface 54b of the mouth piece holder 54 forms one bottom surface of the mouth piece stocker 55, and the mouth pieces 60 are stacked on this rear side surface 54b along the bottom plate 55b to be stocked.

When exchange of the mouth piece is to be performed, the mouth piece holder 54 is made to slide obliquely downwards by driving a cylinder or the like not shown.

It is to be noted that although not illustrated, a mechanism for preventing a mouth piece from being withdrawn, similar to the protrusion 36 in the above-described first preferred embodiment, is provided.

When the mouth piece holder 54 has been lowered up to a certain position, the bottom end of the mouth piece portion projecting upwards from the rear side surface 54b of the mouth piece holder 54 strikes against the top end of the mouth piece at the lowest level in the mouth piece stocker 55, and so, only the mouth piece holder 54 is lowered further with that mouth piece 60 left at the position.

The left mouth piece 60 takes the state where the upper portions of its left and right edges are supported by the top end portions 56a of the arm members 56 and the lower portion of the mouth piece 60 is held in the scoop 54a of the mouth piece holder 54.

This state is shown by double-dot chain lines in FIG. 8.

When the mouth piece holder 54 is lowered further from the above-mentioned state, the lower portion of the mouth piece 60 is disengaged from the scoop 54a of the mouth piece holder 54, and it swings downwards up to the position along the rear side surfaces of the arm members 56 and drops therealong.

The dropped mouth pieces 60 are stacked in the lower half portion of the mouth piece stocker.

At the same time, when the scoop 54a of the mouth piece holder 54 has reached the bottom plate 55b of the mouth piece stocker 55, the mouth pieces stacked in the upper half portion of the mouth piece stocker 55 will fall a little by their own gravity, and the mouth piece 60 at the lowest level will be newly fitted in the scoop 54a of the mouth piece holder 54.

Accordingly, when the mouth piece holder 54 is raised again, the new mouth piece 60 rises as supported by the mouth piece holder 54, and when it has been raised up to a predetermined position, it is pinched between the back plate 52 and the top end portion of the mouth piece holder 54. Thus firmly fixed, the exchange work of the mouth piece is completed.

As described above, in the case of the modified embodiment, since the mouth pieces can be exchanged successively by merely moving the mouth piece holder 54 in the obliquely upward and downward directions, the time necessitated for the exchange work can be shortened further, and the mechanism also can be simplified. Hence maintenance and control are easy, and a cost can be reduced.

However, this modified embodiment is available only when the sequence of exchange of the mouth pieces is predetermined.

As will be apparent from the detailed description above, according to the present invention, in a rotary roll extruder, as the exchange of mouth pieces is automated perfectly, a burden on operators can be reduced.

Furthermore, owing to the fact that even during the exchange of the mouth pieces the extruder can be operated continuously and cutting of the material to be extruded is not effected, the work of successively performing the guidance of the tip end of the material to be extruded can be omitted. Additionally the time necessitated before extruded products having a good precision can be formed stably after exchange of a mouth piece, is shortened. Hence, since the time necessitated for the exchange of the mouth piece is short, the amount of material extruded wastefully is extremely little, and extrusion having an extremely high working efficiency can be realized.

While a principle of the present invention has been described above in connection with preferred embodiments of the invention, it will be apparent that many changes and modifications can be made to the above-described construction without departing from the spirit of the invention.

What is claimed is:

1. A rotary roll extruder, provided with mouth piece moving means for moving a mouth piece along a path in a radial direction of an extruding roll to make the mouth piece move toward and away from the circumferential surface of said extruding roll so as not to cut a material to be extruded, mouth piece positioning means for positioning said mouth piece in a position where said mouth piece is held close to the circumferential surface of said extruding roll, mouth piece exchanging means for exchanging the mouth piece in a position where said mouth piece is held apart from said extruding roll, said mouth piece exchanging means being positioned on said path, and mouth piece stocking means for preliminarily stocking various kinds of mouth pieces.

2. A rotary roll extruder provided with mouth piece moving means for moving a mouth piece along a path in a radial direction of an extruding roll to make the mouth piece move toward and away from the circumferential surface of said extruding roll, mouth piece positioning means for positioning said mouth piece in a position where said mouth piece is held close to the circumferential surface of said extruding roll, mouth piece exchanging means for exchanging the mouth piece in a position where said mouth piece is held apart from said extruding roll, and mouth piece stocking means for preliminarily stocking various kinds of mouth pieces, wherein said mouth piece moving means is a mouth piece holder, said mouth piece stocking means is a mouth piece stocker extending nearly at right angles to said mouth piece holder at a position remote from said extruding roll for supporting a plurality of mouth pieces so as to be extractible towards said extruding roll, said mouth piece holder moving by passing through said mouth piece stocker and having an engaging portion engageable with a selected mouth piece when it passes through said mouth piece stocker towards said extruding roll for exchanging the mouth piece.

3. A rotary roll extruder as claimed in claim 2, wherein said mouth piece stocker has a pair of side plates, said mouth pieces are supported between these side plates, and said mouth piece holder passes through the space between said side plates.

4. A rotary roll extruder as claimed in claim 3, wherein said mouth piece stocker is slidable in the direction perpendicular to said mouth piece holder, and said pair of side plates are provided with a plurality of sets of slots for supporting mouth pieces aligned with each other and spaced at predetermined intervals.

5. A rotary roll extruder as claimed in claim 2 or 3, wherein said mouth piece stocker is inclined with respect to the horizontal direction, and a plurality of mouth pieces are supported in said mouth piece stocker as stacked on one another and as supported on said mouth piece holder.

6. A rotary roll extruder as claimed in claim 2, wherein a chamber block and a taper block are disposed along the circumferential surface of said extruding roll, and said mouth piece is positioned at a position close to the circumferential surface of said extruding roll by the mouth piece holder which is pinched jointly with the mouth piece between said respective blocks.

* * * * *